(12) United States Patent
Almasan et al.

(10) Patent No.: US 12,518,272 B2
(45) Date of Patent: Jan. 6, 2026

(54) SYSTEMS AND METHODS FOR SECURE TRANSACTION PROCESSING USING MACHINE LEARNING AND QUANTUM COMPUTING

(71) Applicant: MCKINSEY & COMPANY, INC., New York, NY (US)

(72) Inventors: Rares Almasan, Paradise Valley, AZ (US); Sonam Jha, Short Hills, NJ (US); Sriram Venkatesan, Princeton Junction, NJ (US); Sastry Vsm Durvasula, Phoenix, AZ (US)

(73) Assignee: MCKINSEY & COMPANY, INC., New York, NY (US)

( * ) Notice: Subject to any disclaimer, the term of this patent is extended or adjusted under 35 U.S.C. 154(b) by 199 days.

(21) Appl. No.: 18/136,846

(22) Filed: Apr. 19, 2023

(65) Prior Publication Data
US 2024/0354750 A1 Oct. 24, 2024

(51) Int. Cl.
*G06Q 20/38* (2012.01)
*G06Q 20/40* (2012.01)

(52) U.S. Cl.
CPC ..... *G06Q 20/3823* (2013.01); *G06Q 20/4016* (2013.01)

(58) Field of Classification Search
CPC .......... G06Q 20/3823; G06Q 20/4016; G06Q 30/0609

USPC .......................................................... 705/75
See application file for complete search history.

(56) References Cited

U.S. PATENT DOCUMENTS

| | | | |
|---|---|---|---|
| 2018/0264347 A1* | 9/2018 | Tran ........................ | G06V 40/28 |
| 2023/0126764 A1* | 4/2023 | Ibrahim .................. | G06N 10/20 |
| | | | 705/44 |
| 2024/0013223 A1* | 1/2024 | Butvinik ................ | G06Q 40/06 |

OTHER PUBLICATIONS

"NIST Announces First Four Quantum-Resistant Cyrptographic Algorithms," https://www.nist.gov/news-events/news/2022/07/nist-announces-first-four-quantum-resistant-cryptographic-algorithms (Jul. 2022).

* cited by examiner

*Primary Examiner* — Zeshan Qayyum
(74) *Attorney, Agent, or Firm* — MARSHALL, GERSTEIN & BORUN LLP; Randall G. Rueth

(57) ABSTRACT

A computer-implemented method for secure transaction processing using machine learning and quantum computing includes receiving input parameters corresponding to a transaction at a processor. A quantum computing processor processes the input parameters using one or more sets of quantum resistive cryptography instructions and further generates encrypted transaction data from the input parameters. The quantum computing processor further generates an indication of whether a transaction is fraudulent based upon the encrypted transaction data by applying a machine learning algorithm or model. The processor then transmits the indication via an electronic network.

17 Claims, 7 Drawing Sheets

SYSTEMS AND METHODS FOR SECURE TRANSACTION PROCESSING USING MACHINE LEARNING AND QUANTUM COMPUTING

FIELD OF THE DISCLOSURE

The present disclosure is generally directed to techniques for secure, real-time transaction processing using machine learning and quantum computing.

BACKGROUND

Financial transactions increasingly occur on computers and over networks which may be insecure or monitored by bad actors. A person or system may gain access to accounts and private information over such networks and systems which may later be used to perform additional financial transactions. Therefore, as transactions are increasingly performed online and over networks, the numbers and types of fraudulent transactions increase. As such, detection and prevention of fraudulent transactions grows even more important.

According to some reports, last year the financial industry lost approximately six billion dollars to fraudulent actions. One complicating factor is that financial transactions may include various actions such as an electronic wiring of funds or request for funds, securities, checks, insurance applications, brokerage actions, etc., with each type of transaction utilizing different networks, technologies, and having its own required procedures. While some systems include fraud detection methods and algorithms, it has been found that these are often ineffective, partly due to the wide range of potential financial transactions. Currently, approximately 95% of fraud detection algorithms produce false positive results which further requires financial organizations to dedicate additional resources to further determine if the flagged transaction is truly fraudulent, or if it is a valid transaction. In instances, it may require an expert in the field of the financial service or transaction to manually analyze and determine the validity of a flagged fraudulent transaction. Such further manual analysis requires time which prevents fraudulent transactions from being detected and stopped in real-time.

As such, current techniques for performing fraudulent transaction detecting, processing, and adjudication are inefficient, time-consuming and require human intervention. An improved solution which alleviates these problems is needed.

BRIEF SUMMARY

In one aspect, a computer-implemented for secure truncation processing using machine learning and quantum computing includes receiving, via one or more processors, input parameters corresponding to a transaction; processing, via one or more quantum computing processors, the input parameters using a set of quantum resistive cryptography instructions to generate encrypted transaction data from the input parameters; generating, by the one or more quantum computing processors using one or more trained machine learning models, an indication of whether a transaction is fraudulent based at least upon the encrypted transaction data; and transmitting the indication via a network, according to an example.

In another aspect, a computing system for secure transaction processing using machine learning and quantum computing includes one or more processors; one or more quantum computing processors; a memory having stored thereon instructions that, when executed, cause the computing system to: receive, via the one or more processors, input parameters corresponding to a transaction; process, via the one or more quantum computing processors, the input parameters using a set of quantum resistive cryptography instructions to generate encrypted transaction data from the input parameters; generate, by the one or more quantum computing processors using one or more trained machine learning models, an indication of whether a transaction is fraudulent based at least upon the encrypted transaction data; and transmit the indication via a network, according to an example.

In yet another aspect, a non-transitory computer-readable storage medium comprising executable instructions that, when executed by a processor, cause a system to: receive, via the one or more processors, input parameters corresponding to a transaction; process, via the one or more quantum computing processors, the input parameters using a set of quantum resistive cryptography instructions to generate encrypted transaction data from the input parameters; generate, by the one or more quantum computing processors using one or more trained machine learning models, an indication of whether a transaction is fraudulent based at least upon the encrypted transaction data; and transmit the indication via a network, according to an example.

BRIEF DESCRIPTION OF THE DRAWINGS

The figures described below depict various aspects of the system and methods disclosed herein. It should be understood that each figure depicts one embodiment of an electronic wiring of funds or request for funds, securities, checks, insurance applications, brokerage actions, etc., particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present aspects are not limited to the precise arrangements and instrumentalities shown, wherein.

Figure 2:
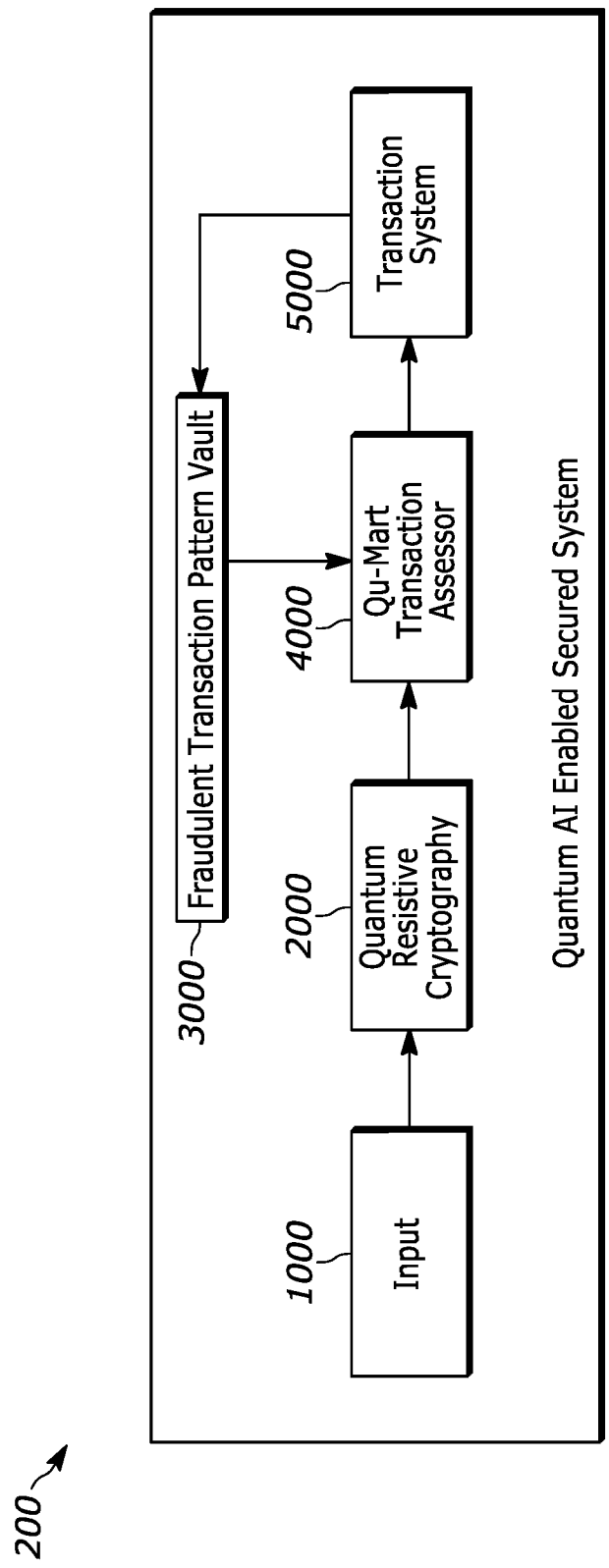
FIG. 2 depicts an exemplary block flow diagram depicting a computer-implemented method for secure transaction processing using machine learning and quantum computing, according to an aspect.

with respect to FIG. 2, to identify, train, or otherwise develop a ML model for flagging and/or verifying fraudulent transactions.

Figure 5:
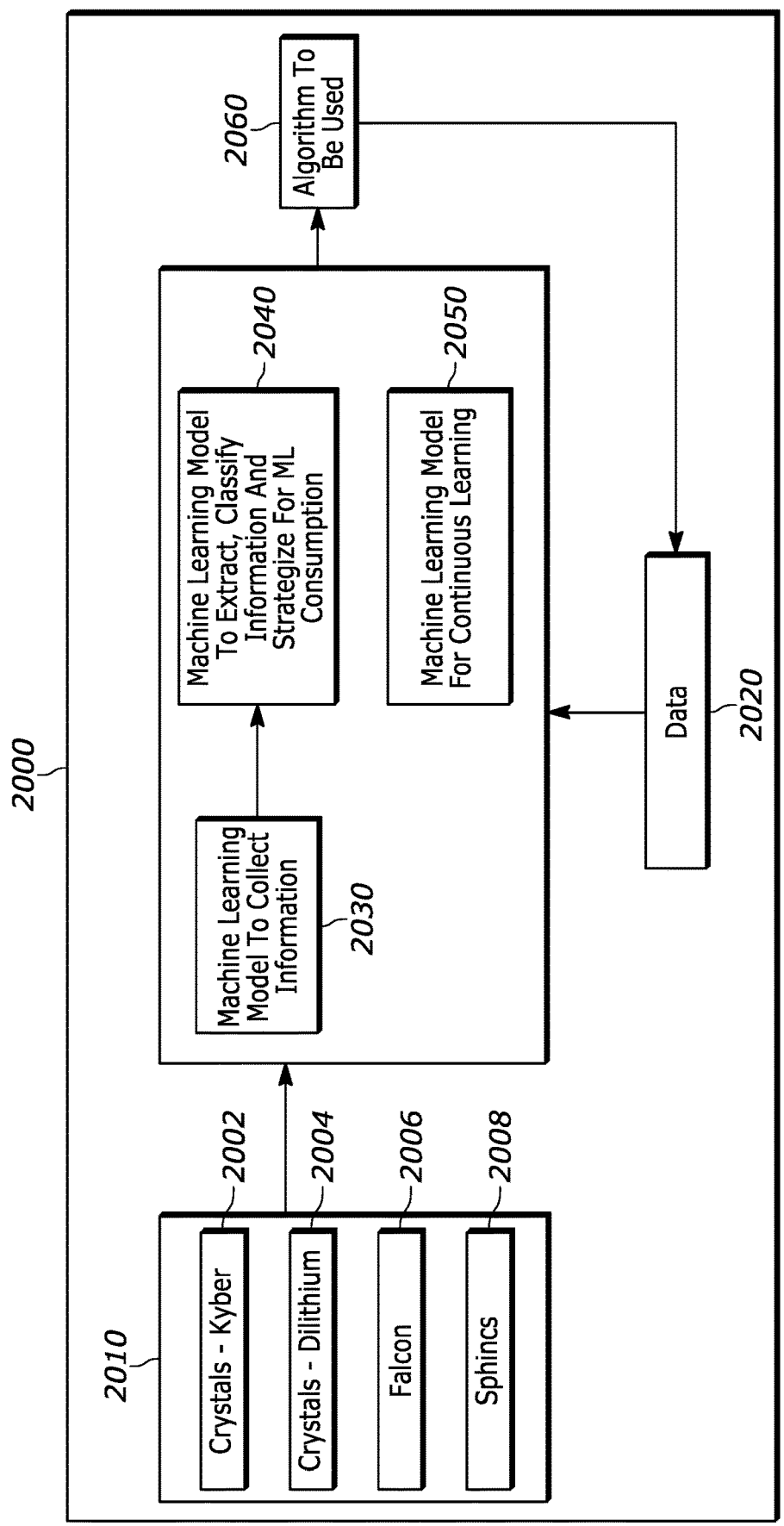
FIG. 5 depicts an exemplary block flow diagram depicting a detailed view of securing transaction data and information via quantum resistive cryptography with respect to FIG. 2, and further utilizing ML algorithms to determine which of a plurality of algorithms should be used to encrypt the data and/or information associated with the transaction.
Figure 7:
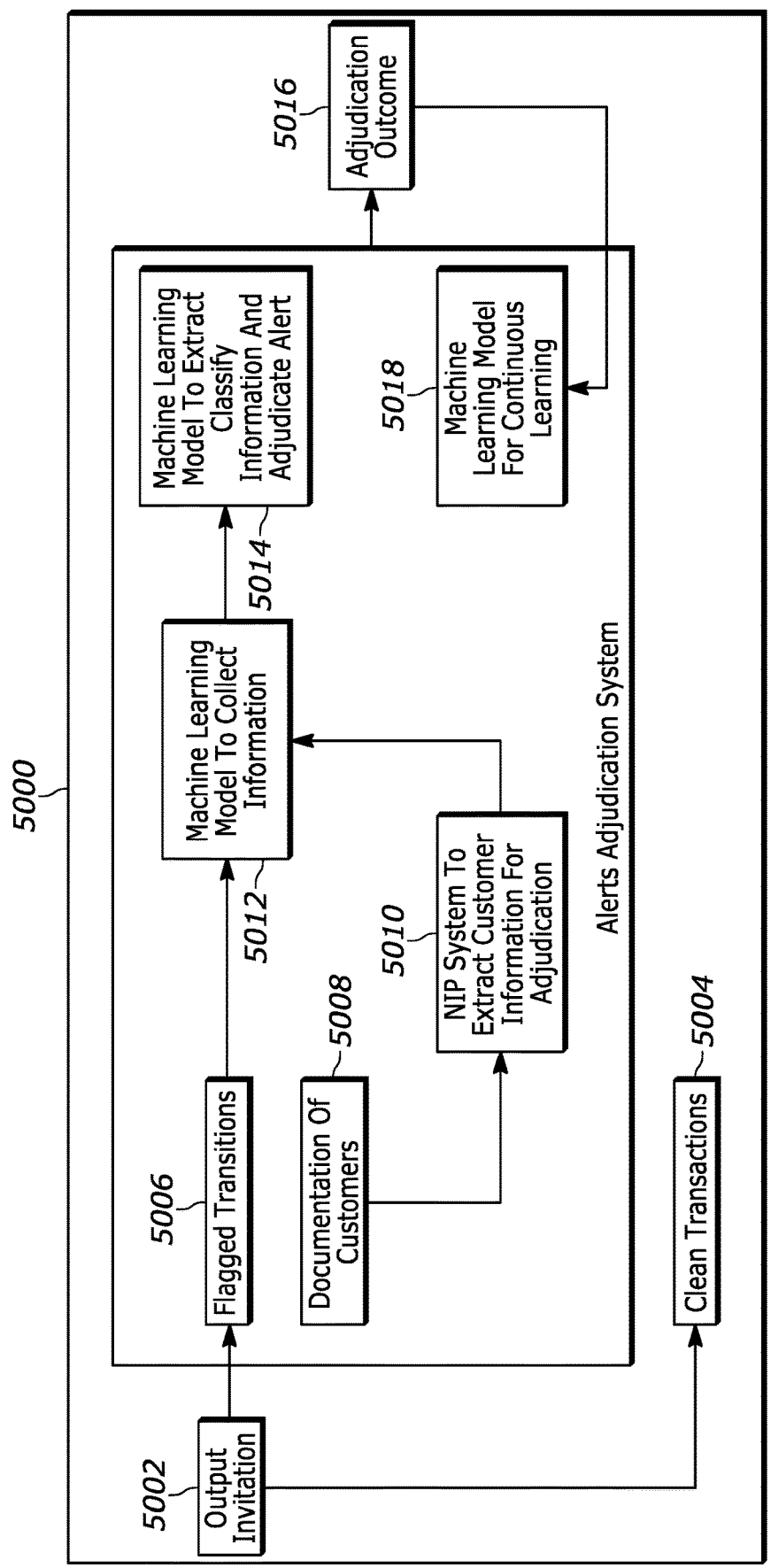

FIG. 7 depicts an exemplary block flow diagram depicting a detail view of output system as the transaction system with respect to FIG. 5 to clean transactions and document flagged fraudulent transactions and associated customers and other parameters and data associated with a fraudulent transaction.

DETAILED DESCRIPTION

Overview

The aspects described herein relate to, inter alia, employing machine learning ("ML") and quantum computing ("QC") for secure transaction processing and, more specifically, to identifying potential fraudulent transactions and verifying the fraudulence of a transaction in real-time. The ML and QC techniques may further determine a high risk transaction of being fraudulent. In some aspects the techniques utilize quantum cryptography and other quantum computing algorithms to process financial transactions to detect fraudulent transactions and perform pattern recognition of trends that may be indicative of fraudulent transactions. The systems and methods disclosed may include a fraudulent pattern vault or database that may include patterns and instructions on how to map and track fraudulent activity. Further, the systems and methods may further improve over time through machine learning and self-learning by identifying additional patterns and/or types of fraudulent transactions. The present techniques may be further used to provide additional information and/or analysis of a flagged potentially fraudulent transaction, removing the need for human manual analysis and intervention.

Exemplary Computing Environment

Figure 1:
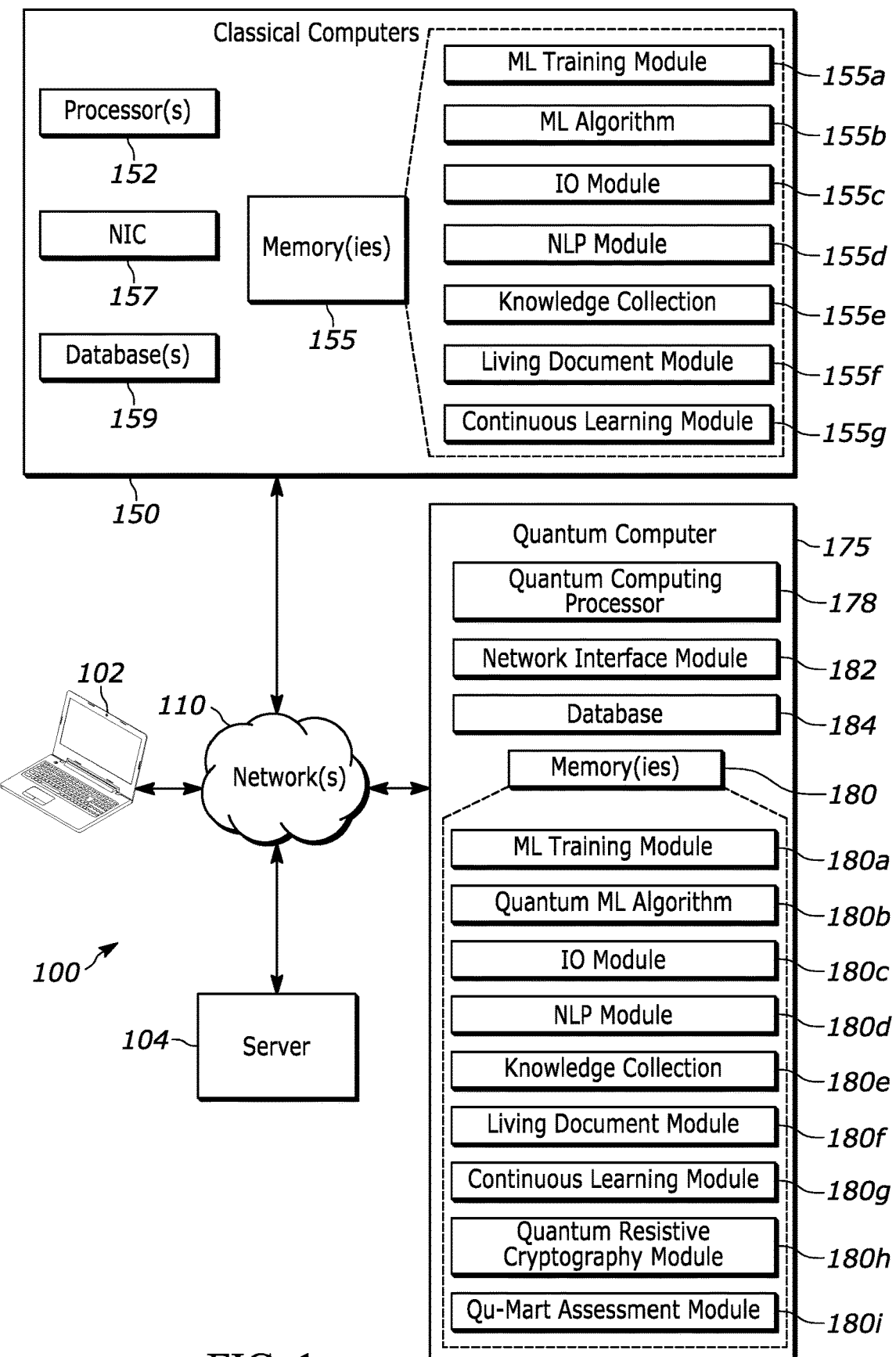
FIG. 1 depicts an exemplary computing environment for secure transaction processing using machine learning and quantum computing, in some aspects.

FIG. 1 depicts a computing environment 100 in which secure transaction processing may be performed, in accordance with various aspects discussed herein. In the example aspect of FIG. 1, computing environment 100 includes client(s) 102, which may comprise one or more computers, a classical computer 150, and a quantum computer 175. In various aspects, client(s) 102 comprise multiple computers, which may comprise multiple, redundant, or replicated client computers accessed by one or more users. The environment 100 may further include an electronic network 110 communicatively coupling other aspects of the environment 100. The client device 102 may be any suitable device (e.g., a laptop, a smart phone, a tablet, a wearable device, a blade server, etc.).

The client device 102 may include a memory and a processor for, respectively, storing and executing one or more modules. The memory may include one or more suitable storage media such as a magnetic storage device, a solid-state drive, random access memory (RAM), etc. The client device 102 may access services or other components of the environment 100 via the network 110. A proprietor of the present techniques may access the environment 100 via the client device 102, to access services or other components of the environment 100 via the network 106. A customer, or user, of the environment 100 (e.g., a persona, as discussed herein) may access the environment 100 via another client device 102.

The environment 100 may further include a server 104 that may store information, tasks, KYC data, ML models, or other data and information for performing the methods described herein. The server 104 may store a jobs list or task list and the server may provide instructions to other components (e.g., the classical computer 150 and/or quantum computer 175) to control and/or provide information to, and receive data, from the components of the environment. In an example described herein, the server may store a plurality of jobs such as ML training tasks, fraudulent transaction jobs, risk evaluation jobs, etc. that may be provided to the classical computer 150 and/or quantum computer 175 for performing the methods described herein. The classical computer 150 and quantum computer 175 may process the data, train an ML model, and/or execute an ML model and return results to the server 104. In examples, a user may provide a job or task to the server 104 via the client device 102. In other implementations, the server may be omitted and jobs or other instructions may be provided to components of the environment 100 via one or more of the client device 102 or another computational device such as directly via the classical computer 105 and/or quantum computer 175. As described herein and in some aspects, the server 104 may perform functionalities as part of a "cloud" network or may otherwise communicate with other hardware or software components within one or more cloud computing environments to send, retrieve, or otherwise analyze data or information described herein. For example, in aspects of the present techniques, the computing environment 100 may comprise an on-premise computing environment, a multi-cloud computing environment, a public cloud computing environment, a private cloud computing environment, and/or a hybrid cloud computing environment. For example, any entity (business) offering the intelligent onboarding system may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by the business offering the intelligent onboarding system. The public cloud may be partitioned using visualization and multi-tenancy techniques and may include one or more IaaS and/or PaaS services. In some aspects of the present techniques, the current computing environment of the customer may comprise a private cloud that includes one or more cloud computing resources (e.g., one or more servers, one or more databases, one or more virtual machines, etc.) dedicated to the customer's exclusive use. In some aspects, the private cloud may be distinguished by its isolation to hardware exclusive to the customer's use. The private clouds may be located on-premise of the customer, or constructed from off-premise cloud computing resources (e.g., cloud computing resources located in a remote data center). The private clouds may be third-party managed and/or dedicated clouds.

In still further aspects of the present techniques, the current computing environment may comprise a hybrid cloud that includes multiple cloud computing environments communicatively coupled via one or more networks (e.g., the network 110). For example, in a hybrid cloud computing aspect, the current computing environment may include one or more private clouds, one or more public clouds, a bare-metal (e.g., non-cloud based) system, etc. The future computing environment may comprise one or more public clouds, one or more private clouds, one or more bare-metal systems/servers, and/or one or more hybrid clouds. The servers 104 may be implemented as one or more public clouds, one or more private clouds, one or more hybrid clouds, and/or one or more bare-metal systems/servers. For example, the servers 104 may be implemented as a private cloud computing environment that orchestrates the migration of a current computing environment implemented as a first hybrid cloud (e.g., comprising two public clouds and three private clouds) to a future computing environment implemented as a second hybrid cloud (e.g., comprising one public cloud and five private clouds).

The network 110 may comprise any suitable network or networks, including a local area network (LAN), wide area network (WAN), Internet, or combination thereof. For example, the network 110 may include a wireless cellular service (e.g., 4G). Generally, the network 110 enables bidirectional communication between the client device 102 and the servers 104. In some aspects, network 110 may comprise a cellular base station, such as cell tower(s), communicating to the one or more components of the environment 100 via wired/wireless communications based on any one or more of various mobile phone standards, including NMT, GSM, CDMA, UMMTS, LTE, 5G, or the like. Additionally or alternatively, network 110 may comprise one or more routers, wireless switches, or other such wireless connection points communicating to the components of the environment 100 via wireless communications based on any one or more of various wireless standards, including by non-limiting example, IEEE 802.11a/b/c/g (WIFI), the BLUETOOTH standard, or the like.

The environment 100 includes a classical computer 150 that includes one or more processors 152, one or more computer memories 155, one or more network interface controllers (NICs) 157 and an electronic database 159. In the field of computer arts, a classical computer is typically understood as a computer or processor that uses electrical, and in some cases optical, signals and binary bits to process, store, and represent data. The NIC 157 may include any suitable network interface controller(s), and may communicate over the network 110 via any suitable wired and/or wireless connection. The classical computer 150 may include one or more input devices (not depicted) and may include one or more devices for allowing a user to enter inputs (e.g., data) into the classical computer 150. For example, the input device may include a keyboard, a mouse, a microphone, a camera, etc. In some aspects, the input device may be a dedicated client computing device 102 (e.g., located local to or remote to the classical computer 150). The NIC 157 may include one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 110.

Further, the environment 100 includes a quantum computer 175 that includes one or more quantum computing processors 178, a one or more quantum memories 180, a network interface module 182, and a database 184. In the field of computer arts, a quantum computer or quantum processor utilizes quantum bits, referred to as qubits, to represent, process, and store information and/or data. While a classical electrical bit is limited to a binary state of on or off, 1 or 0, etc., a qubit can exist in superpositions of states allowing for multiple qubit states to exist, be stored, or be used for processing, at a same time. Therefore, a quantum computer may be considered to perform multiple processes in parallel, whereas a classical computer can only perform such processes sequentially in a serial manner. Using qubits, quantum processors are capable of processing data at much higher speeds and much greater quantities than classical computers. As such, quantum computers may be beneficial in performing optimizations, complex ML modeling, and training of ML models and AI.

The network interface module 182 may include any suitable network interface controller(s), and may communicate over the network 110 via any suitable wired and/or wireless connection. The quantum computer 175 may include one or more input devices (not depicted) and may include one or more devices for allowing a user to enter inputs (e.g., data) into the quantum computer 175. For example, the input device may include a keyboard, a mouse, a microphone, a camera, etc. In some aspects, the input device may be a dedicated client computing device 102 (e.g., located local to or remote to the classical computer 150), or the input device may be the classical computer 150. The network interface module 182 may include one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 110. As such the quantum computer 175 may receive, or retrieve, data and executable commands from the client device 102, classical computer 150, and/or the server 104. The one or more quantum memories 180 may include classical memory in addition to one or more quantum memory devices.

As used herein, "quantum computing algorithm" or "quantum algorithm" may refer to an algorithm operable on a quantum computing system that makes use of quantum properties of one or more particles in order to perform a computation. A quantum computing algorithm may or may not be faster or more efficient than a comparable classical computing algorithm.

"Quantum computing hardware," "quantum computing processor," or simply "quantum processor" may refer to properties and hardware of a quantum computing system that define how much quantum processing power a quantum computer possesses, how much information the quantum computer can store or process, and/or how quickly, efficiently, accurately, or frequently the quantum computer can make use of that processing power and/or storage capacity. Some examples of measurements of quantum computing hardware include the number of qubits that can be manipulated by the quantum computer, the configuration or architecture of the qubits, the error rate in the hardware, the amount of noise in the hardware, the decoherence time of the qubits, and other features that may limit the availability or usability of the quantum hardware.

A "quantum computer" or "quantum computing system" may refer to a computing system that uses quantum properties of particles in order to perform quantum computations. Quantum computing systems may leverage phenomenon such as quantum superposition and/or entanglement in order to probabilistically evaluate multiple solutions to a problem at the same time. Using quantum processing techniques, quantum algorithms are capable of performing at speeds of estimated thousands, hundreds of thousands, to millions, and even hundreds of millions of times faster than classical computers. Even faster quantum computers are likely to emerge as the technology is further developed. As such, quantum computers are capable of performing tasks in milliseconds or less, that would take a classical computer on the order of seconds, or even longer. Therefore, utilizing a quantum computer for certain tasks in a pipeline allows for the real-time detection and verification of transactions as described herein. Further, quantum computers are used herein for performing training of ML models and algorithms which requires large data sets. Often a larger set of data results in a more accurately trained ML model, therefore, it is desirable to utilize quantum computing and processing to include very large sets of data for training the ML models as described herein. Further, the ML models may be updated using quantum computing in real-time to improve the performance of the ML models during, and between, identification of fraudulent transactions. As such, the methods described herein cannot be performed strictly using classical computers alone, as the classical processing techniques would be too slow to detect and flag fraudulent transactions in real-time, and further, to update the ML models continuously during operation. Additionally, the methods may include determining a risk of a transaction, and high risk transaction patterns or parameters may be stored and used to continuously train one or more of the ML models described herein.

As used herein, the term "real-time," or in "near real-time" means the process is performed between a time that a transaction is initiated and before a vendor or institution finalizes the transaction. For example, a ML model trained in real-time, as described herein, is trained between a time that an individual user provides appropriate information and approval for purchasing an time (e.g., a stock purchase, commercial time, etc.) and before the vendor (e.g., stock-holding institution, individual seller, etc.) finalizes the transaction for fulfilment. As such, fraudulent transactions may be detected and the transactions may be cancelled or nullified before the transaction is fulfilled. Additionally, the described methods and systems are capable of performing pattern recognition and building pattern databases to better detect and verify fraudulent transactions in the future. Typically, classical computers are incapable of performing ML training and detection of fraudulent transactions at speeds fast enough to detect and prevent fraudulent transactions during a given transaction. As such, as described herein, the leveraging of quantum computers and processing allows for the ML training based on robust data sets to accurately identify fraudulent transactions in real-time, and evaluate risk of a transaction.

The classical processor 152 may include one or more suitable processors (e.g., central processing units (CPUs) and/or graphics processing units (GPUs)). The classical processor 152 may be connected to the memory 155 via one or more electrical and/or optical computer busses (not depicted) responsible for transmitting electronic data, data packets, or otherwise electronic signals to and from the processor 152 and memories 155 in order to implement or perform the machine readable instructions, methods, processes, elements or limitations, as illustrated, depicted, or described for the various flowcharts, illustrations, diagrams, figures, and/or other disclosure herein. The processor 152 may interface with the memory 155 via a computer bus to execute an operating system (OS) and/or computing instructions contained therein, and/or to access other services/aspects. For example, the processor 152 may interface with the memory 155 via the computer bus to create, read, update, delete, or otherwise access or interact with the data stored in memory 155 and/or the database 159.

The quantum computing processor 178 may include one or more suitable processors (e.g., central processing units (CPUs) and/or graphics processing units (GPUs)). In examples, the quantum processor may include one or more of a circuit-based quantum processor, an annealing quantum processor, an analog quantum processor, a universal quantum processor, a photonic processor, a neutral atom processor, a Rydberg atom processor, or another type of processor that utilizes the effects of quantum mechanics to process signals and data. The quantum processor 178 may be connected to the quantum memory 180 via one or more electrical and/or optical computer busses (not depicted) responsible for transmitting electronic data, photonic data, data packets, or otherwise signals indicative of information to and from the processor 178 and quantum memory 180 in order to implement or perform the machine readable instructions, methods, processes, elements or limitations, as illustrated, depicted, or described for the various flowcharts, illustrations, diagrams, figures, and/or other disclosure herein. The quantum processor 178 may interface with the quantum memory 180 via a computer bus to execute an operating system (OS) and/or computing instructions contained therein, and/or to access other services/aspects. In examples, the quantum processor 178 may interface with other components of the quantum computer 175 via a quantum bus which allows for the preservation of states of a qubits, storage of qubits, sharing of information between qubits, and the communicating of information encoded on qubits between elements of the quantum computer 175. The quantum bus may include a resonance cavity, trapped ions, phonons, photons, and/or superconducting qubits.

For example, the processor 178 may interface with the quantum memory 180 via the computer bus to create, read, update, delete, or otherwise access or interact with the data stored in the quantum memory 180 and/or the database 184.

The memories 155 and 180 may each independently include one or more forms of volatile and/or non-volatile, fixed and/or removable memory, such as read-only memory (ROM), electronic programmable read-only memory (EPROM), random access memory (RAM), erasable electronic programmable read-only memory (EEPROM), quantum memory, qubits, and/or other hard drives, flash memory, MicroSD cards, and others. The memories 155 and 180 may store an operating system (OS) (e.g., Microsoft Windows, Linux, UNIX, etc.) capable of facilitating the functionalities, apps, methods, or other software as discussed herein. The memories 155 and 180 may store a plurality of computing modules, implemented as respective sets of computer-executable instructions (e.g., one or more source code libraries, trained ML models such as neural networks, convolutional neural networks, quantum processing algorithms, etc.) as described herein.

The quantum memory 180 may additionally include quantum memory elements for storing quantum states of qubits to later retrieve state information, or information associated with a qubit that is stored in the quantum memory. The quantum memory 180 may be written to, and read from, analogous to classical memory devices, but the quantum memory 180 including elements and hardware that allow for the writing and retrieving of quantum states and information. In examples, the quantum memory 180 may include one or more atomic gas quantum memories, solidi quantum memories, gradient echo memory, rare earth doped crystals, a Raman scattering solid, or another quantum memory element or device. In examples, the quantum memory 180 must preserve the quantum state of a qubit for further retrieval at a later time.

In examples, the quantum memory 180 may store one or more ML training modules 155*a* which may receive labeled data at an input layer of a model having a networked layer architecture (e.g., an artificial neural network, a convolutional neural network, etc.) for training the one or more ML models to generate ML models. The received data may be propagated through one or more connected deep layers of the ML model to establish weights of one or more nodes, or neurons, of the respective layers. Initially, the weights may be initialized to random values, and one or more suitable activation functions may be chosen for the training process, as will be appreciated by those of ordinary skill in the art. The method may include training a respective output layer of the one or more ML models. The output layer may be trained to output a prediction. For example, the ML training module 155a may train a machine learning algorithm to determine if a financial transaction is fraudulent. Further, the ML training module 155a may train a machine learning algorithm to identify patterns in data and trends that are indicative of potentially fraudulent transactions or fraudulent activities.

In general, a computer program or computer based product, application, or code (e.g., the model(s), such as ML models, quantum computing algorithms, quantum cryptography algorithms, or other computing instructions described herein) may be stored on a computer usable storage medium, or tangible, non-transitory computer-readable medium (e.g., standard random access memory (RAM), an optical disc, a universal serial bus (USB) drive, quantum memory, or the like) having such computer-readable program code or computer instructions embodied therein, wherein the computer-readable program code or computer instructions may be installed on or otherwise adapted to be executed by the processor(s) 152 and/or the quantum processor 178 to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, Qisket, Ocean, Q #, Cirq, QCL, QMASM, SiIQ, QML, Quantum Lambda Calculus, QFC, QPL, etc.).

Each of the databases 159 and 184 may be a relational database, such as Oracle, DB2, MySQL, a NoSQL based database, such as MongoDB, a Quantum Ledger Database, a Quantum Materials Database, or another suitable classical or quantum database. The databases 159 and 184 may store data and be used to train and/or operate one or more ML/artificial intelligence ("AI") models.

The quantum memory 180 of the quantum computer may additionally include one or more machine learning training modules 180a which may receive labeled data at an input layer of a model having a networked layer architecture (e.g., an artificial neural network, a convolutional neural network, etc.) for training the one or more ML models to generate ML models. The received data may be propagated through one or more connected deep layers of the ML model to establish weights of one or more nodes, or neurons, of the respective layers. Initially, the weights may be initialized to random values, and one or more suitable activation functions may be chosen for the training process, as will be appreciated by those of ordinary skill in the art. The method may include training a respective output layer of the one or more ML models. The output layer may be trained to output a prediction. For example, the ML training module 155a may train a machine learning algorithm to determine if a financial transaction is fraudulent. Further, the ML training module 155a may train a machine learning algorithm to identify patterns in data and trends that are indicative of potentially fraudulent transactions or fraudulent activities. The machine learning training modules 180a of the quantum computer 175 may train machine learning algorithms 155b that are executed on the classical computer 150. Due to the increased processing capabilities of the quantum computing processor 178, the quantum computer 175 may train a machine learning algorithm 155b of the classical computer 150 in real time and the machine learning algorithm 155b may then be executed at runtime, in real time, or nearly real time to validify transactions and/or identify fraudulent transactions or evaluate risk of a transaction. Additionally, the machine learning training modules 180a of the quantum computer 175 may train machine learning algorithms executed by the quantum computer at runtime, in real-time, or in near real time. Training and execution of machine learning algorithms via the quantum computer 175 allows for much faster training and real-time execution of the machine learning algorithms for much larger data sets and training sets than able to be performed by a classical processor or computer.

In various aspects, a ML model, as described herein, may be trained using a supervised or unsupervised ML program or algorithm. The ML program or algorithm may employ a neural network, which may be a convolutional neural network, a deep learning neural network, or a combined learning module or program that learns in two or more features or feature datasets (e.g., structured data, unstructured data, etc.) in a particular area of interest. The ML programs or algorithms may also include natural language processing (NPL), semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other ML algorithms and/or techniques. In some aspects, the artificial intelligence and/or ML based algorithms may be included as a library or package executed on server(s) 104. For example, libraries may include the TensorFlow based library, the Pytorch library, and/or the scikit-learn Python library. In examples herein, an ML model may be trained using the quantum computer 175 a quantum computing library such as TensorFlow quantum, Cirq, Strawberry Fields, IBM Qiskit, Quantum Development Kit, Q #, QiSkit, ProjectQ, or another quantum computing framework.

Machine learning may involve identifying and recognizing patterns in existing data (e.g., data from previous use cases which were ML tractable) in order to facilitate making predictions, classifications, and/or identifications for subsequent data (e.g., using models to determine ML tractability for a use case, a use case feasibility score, a scoring threshold, system and/or process improvements).

ML model(s) may be created and trained based upon example data (e.g., "training data") inputs or data (which may be termed "features" and "labels") in order to make valid and reliable predictions for new inputs. In supervised ML, an ML program operating on a server, computing device, or other processor(s), may be provided with example inputs (e.g., "features") and their associated, or observed, outputs (e.g., "labels") in order for the ML program or algorithm to determine or discover rules, relationships, patterns, or otherwise ML "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or other processor(s), to predict, based on the discovered rules, relationships, or model, an expected output.

In unsupervised ML, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised ML may also comprise retraining, relearning, or otherwise updating models with new, or different, information, which may include information received, ingested, generated, or otherwise used over time. The disclosures herein may use one or both of such supervised or unsupervised ML techniques.

In some aspects, each of the memories 155 and 180 respectively includes one or more ML algorithms 155b and quantum ML algorithms 180b, with each comprising a set of computer-executable instructions implementing ML loading, configuration, initialization and/or operation functionality. The ML algorithms 155b and quantum ML algorithms 180b may include instructions for storing trained models (e.g., in the electronic databases 159 and 184 or on the server 104). Once trained, the one or more trained ML models may be operated in inference mode, whereupon when provided with de novo input that the model has not previously been provided, the model may output one or more predictions, classifications, etc. as described herein.

In some aspects, each of the memories 155 and 180 may include a respective input/output (I/O) module 155c and 180c, comprising a set of computer-executable instructions implementing communication functions. The I/O modules 155c and 180c may include a communication component configured to communicate (e.g., send and receive) data via one or more external/network port(s) to one or more networks or local terminals, such as computer network 110 and/or the client device 102 (for rendering or visualizing) described herein. In some aspects, servers 104 may include a client-server platform technology such as ASP.NET, Java J2EE, Ruby on Rails, Node.js, a web service or online API, responsive for receiving and responding to electronic requests.

The I/O modules 155 and 180 may further include or implement an operator interface configured to present information to an administrator or operator and/or receive inputs from the administrator and/or operator. An operator interface may provide a display screen. The I/O modules 155 and 180 may facilitate I/O components (e.g., ports, capacitive or resistive touch sensitive input panels, keys, buttons, lights, LEDs), which may be directly accessible via, or attached to, servers 104 or may be indirectly accessible via or attached to the client device 102. According to some aspects, an administrator or operator may access the servers 104 via the client device 102 to review information, make changes, input training data, initiate training via the ML model training modules 155a and/or 180a, and/or perform other functions (e.g., operation of one or more trained models via the ML operation modules 155a and 180a).

In some aspects, the memories 155 and 180 may include a natural language processing (NLP) module 155d and 180d, comprising a set of computer-executable instructions implementing natural language processing functionality.

In some aspects, the memory 155 and 180 may each respectively include a knowledge collection module 155e and 180e. The knowledge collection modules 155e and 180e may include computer-executable instructions for collecting knowledge related to business, technology, and financial transactions. In some aspects, the knowledge may be stored in the databases 159 and 184, or provided by the client device 102 or server 104. The knowledge may be represented in an ontology or other format (e.g., a hierarchical storage format). The knowledge may be indexed and searchable, in some aspects. In some aspects, the knowledge may be stored as a collection of hyperlinked pages that may be traversed.

In some aspects, the memories 155 and 180 may further include living document modules 155f and 180f. The living document modules 155f and 180f may include computer-executable instructions for storing, updating and creating living documents. A living document may be an electronic document (e.g., Microsoft Word documents, LaTeX documents, HTML documents, Python Notebooks, flat files, etc.). In some aspects, the living documents may be represented as code, pseudocode or as structured text (e.g., markdown, reStructuredText, JSON, XML, etc.). The living document modules 155f and 180f may include instructions for storing, retrieving and updating living documents (e.g., living documents stored in the databases 159 and 184, in the memories 155 and 180, or on the server 104).

The memories 155 and 180 may include a continuous learning module 155g and 180g that each may include computer-executable instructions for continuously updating the one or more living documents. Updating the one or more living documents may be performed by modifying elements of the living documents (e.g., paragraphs, tables, headings, images, etc.).

The quantum memory 180 of the quantum computer 175 may further include a quantum resistive cryptography module 180h to perform quantum cryptography on input data and real-time signals. The quantum resistive cryptography module may utilize, alone or in combination, various cryptography algorithms or executable instructions including CRYSTALS-Kyber, CRYSTALS-Dilithium, Falcon, Sphincs, or another quantum cryptography algorithm or set of instructions. The quantum resistive cryptography module 180h receives, or retrieves, input data and real-time signals and encrypts the data to prevent decryption via any classical or quantum computational methods.

The quantum memory 180 of the quantum computer 175 may further include a Qu-mart transaction assessment (QTA) module 180i. The QTA module 180i leverages the enhanced speed and bandwidth of quantum computing to assess if a financial transaction is fraudulent or not. The QTA module 180i may perform an initial flagging of a potentially fraudulent transaction and/or the QTA module 180i may perform a validity check on one or more flagged potentially fraudulent transactions to verify if a transaction is fraudulent or not. The QTA module 180i may employ multiple ML algorithms to flag and validate a fraudulent transaction. For example, the QTA module 180i may include a ML algorithm that collects and categorizes all input data and parameters large data sets with complex sets of data, and a ML algorithm to generate a fraudulent transaction prediction ML model at runtime, in real time or in near-real time based on the collected input data and parameters. The QTA module 180i may additionally include the generated fraudulent transaction prediction ML model. The fraudulent transaction prediction ML model determines whether a transaction is fraudulent or not based on any stored data and/or data provided or retrieved from another source such as any input data that correlates with an fraudulent, or potentially fraudulent, incident. The fraudulent transaction prediction ML model generates an evaluation (e.g., positive, negative) of whether a transaction is fraudulent, and the positively flagged fraudulent transactions may be further considered for verification of fraudulence. The QTA module 180i may use data such as structured data, semi-structured data, and/or unstructured data sets. Further, the data sets may be further processed using feature engineering, feature selection and synthetic data generation to evaluate data quality, completeness, and reliability.

The QTA module 180i further may include a categorization ML model to categorize data based on transaction type, financial organization type, customer profile, a risk rating, etc. The QTA module 180i then may further include a continuous learning ML module for continuous learning that receives information regarding a flagged fraudulent transaction and any associated patterns, data, and categorical information to further develop the fraudulent transaction prediction ML model and the categorization ML model. In examples herein, a continuous learning ML module may also perform as a pattern ML module that determines patterns and trends of data and input parameters to further update and retrain ML models as described herein.

In operation, a user of the client device 102 (e.g., a software engineer or employee of the consultancy) may access the server 104 and train one or more machine learning models using one or more of the machine learning model training modules 155a and 180a. For example, the engineer may configure the server 104 to ingest information via the knowledge collection modules 155e and/or 180e from data engines, data sources (e.g., internal or external data sources), etc. While described as using the client device 102, and the server 104, to access ML models of the classical and quantum computers 150 and 175, a user may directly use the classical and/or quantum computers to access ML models, memories, databases, or to access other elements of the classical and quantum computers 150 and 175. The engineer may access historical data in the databases 159 and/or 184 regarding previously successful consulting projects. The engineer may use the data to train the model to identify new knowledge, and may configure another set of instructions (e.g., the continuous learning module) to perform updates to one or more living documents via the living document modules 155f and/or 180f, accessing the trained machine learning model to receive output to add to the living document. For example, the engineer may configure the machine learning model to train on historical cloud computing migration projects (e.g., ERP transformations) across many industries. It will be appreciated that the machine learning model training modules 155a and/or 180a may be used to train disparate models each directed to narrow industries, in some aspects. The engineer may also train a natural language processing (NLP) model and other models.

A client from a particular industry (e.g., healthcare, finance, etc.) may then contract with the consultancy for performing a single analysis, or for continuously monitoring transactions for fraudulent activity. The client may input a problem statement (e.g., "I want to perform a continuous monitoring of a transaction log for fraudulent activity.") into the server 104. The server may analyze the user's problem statement via a natural language processing model trained by the machine. The NLP model may identify the problem type (e.g., detection and validation of fraudulent activity, fraudulent transaction pattern recognition, etc.) and the source environment parameter (e.g., a bank transaction feed, financial institution records, etc.). In some aspects, the server may include instructions for querying additional information from the user. The additional information may be determined based on querying knowledge management information in the databases 159 and/or 184, for example, to retrieve financial parameter data or data related to the client (e.g., customer financial market activity, etc.). The server may receive additional information from external engines, such as intelligent could data and technology solutions engine data, smart domain expertise solutions engine data, AI-drive experimentation engine data, and/or more, as discussed herein.

The server may analyze all of the received information using the trained machine learning models, that were trained by the engineer, or automatically trained by the quantum computer 175, between initiation of a transaction and fulfillment of the transaction (e.g. between when a customer commits to buy an item and before a merchant processes the transaction). Additionally, the machine learning modules may be trained at runtime and/or in real-time by the quantum computer 175 based on input information from the client, data retrieved from a financial feed, or data and information retrieved from the databases 159 and/or 184 The trained machine learning models may generate a solution for the client, and one or more living documents. The one or more living documents may be existing documents that are provided unmodified, modified or created from scratch, in some aspects. Based on feedback from the client, the server may update the living documents using new information. The server may also asynchronously update the living documents based on information received at any time.

In an embodiment of the present systems and methods discussed herein, the intelligent system may use ML and quantum algorithms to detect and verify fraudulent transactions and/or to perform pattern recognition of data and parameters associated with fraudulent transactions. The fraudulent transaction may include one or more financial transactions such as depositing a check, buying or selling stock, electronic wiring of funds or request for funds, securities, insurance applications, brokerage actions, mortgage applications, purchasing of any good or service, etc. Utilizing quantum computing over classical cryptographic and ML training methods and computer systems allows for much faster ML training outputs and pattern recognition over greater search spaces and over much greater input databases and using real-time signals. While classical solvers rely on sampling one state at a time, quantum computing algorithms can consider multiple states of a search space, and therefore, may determine multiple possible solutions and identify more complex patterns and relationships simultaneously via a super-position representation of the states. This allows for a more efficient sampling method in a search space and may scale much better as problems, data inputs, and search spaces increase in size as compared to classical methods.

The described methods combining the use of classical and quantum computers may completely automate the process of identifying and verifying fraudulent transactions.

Exemplary High-Level System Flow

FIG. 2 is an exemplary block flow diagram depicting a computer-implemented method 200 for performing secure transaction processing using machine learning and quantum computing. Specifically, the method 200 may be used to identify and verify fraudulent financial transactions at runtime, in real-time, or in near real time. The method 200 uses real-time signals, input data and parameters pertaining to one or more financial transactions which may include a type of transaction, location of an action associated with a transaction, information regarding a financial institution, an monetary amount, transaction or financial trends, financial industry knowledge, or other data and parameters to identify and verify fraudulent transactions. Additionally, the method 200 leverages both classical and quantum computing to generate ML models and to identify the fraudulent transactions at runtime and/or in real time. The method 200 may allow for fraudulent transactions to be reduced, therefore reducing monetary losses to financial institutions and economies.

The method 200 may include an input module that receives or retrieves input parameters corresponding to one or more transactions (block 1000). The method 200 may be performed using one or more computational systems such as the environment 100 of FIG. 1. As such, to provide clarity of example, parts of the method 200 may be described with reference to elements of FIG. 1. The input parameters may include data associated with a person or a user, data associated with a financial institution, a type of financial institution, a type of financial transaction, information known to the financial industry domain, financial institution markers (e.g., banking numbers, routing numbers, recipients, etc.), user markers (e.g., number of correspondence between two or more parties, etc.), domain markers (e.g., newly created domains, indications of if a domain is similar to a verified domain, etc.), and/or threat intelligence or information of a specific domain (e.g., if a newly created domain is similar to an original domain, etc.). The input parameters may further includes data from a vendor, data or information from a third party, business-to-business data, and/or business-to-consumer data. Block 1000 may be performed by a processor, such as the processor 152, receiving or retrieving the input parameters.

The processor 152 may then provide the input parameters to the quantum computer 175 via the network 110. The method 200 may then include processing the input parameters using a set of quantum resistive cryptography instructions and generating encrypted transaction data from the input parameters (block 2000). The quantum computing processor 178 may perform the quantum resistive cryptography to generate the encrypted transaction data. Further, The quantum computing processor 178 may both receive/retrieve the input parameters at block 1000 and perform the quantum resistive cryptography at block 2000. To encrypt the input parameters, the quantum computing processor may employ the quantum resistive cryptography module 180*h* to perform one or more quantum resistive cryptography algorithms or instructions. The quantum resistive cryptography provides protection against decryption of data and information associated with the transaction.

The method 200 may further include the quantum computing processor performing ML modes to determine if the transaction is a fraudulent transaction via a Qu-mart transaction assessor (block 4000). The Qu-mart transaction assessor receives, or retrieves, information, data, and patterns from a fraudulent transaction pattern vault 3000 (block 3000) to perform the ML models. The fraudulent pattern vault may include threat intelligence data or information pertaining to a specific domain, financial institution markers (e.g., banking numbers, routing numbers, recipients, etc.), user markers (e.g., number of correspondence between two or more parties, etc.), domain markers (e.g., newly created domains, indications of if a domain is similar to a verified domain, etc.), ML generated predictions of fraudulent transactions based on recorded historical incidents of fraud, and/or patterns of potential fraudulent generated with gamification and ML generated synthetic data for unforeseen or previously unexperienced situations and incidents. Further, data, documents, and pattern information of the fraudulent pattern vault may be stored on either of the databases 159 and/or 184. The method 200 may further include the quantum computing processor 178 or the processor 152 of the classical computer 150 generating an output prediction including an indication of whether the transaction is a fraudulent transaction. The method may then include transmitting the indication via an electronic network. For example, the method may include providing the indication of whether a transaction is fraudulent to an intelligent real time transaction system (block 5000) which receives information pertaining to the fraudulent transaction may also categorize the fraudulent transaction. The fraudulent transaction pattern vault receives information from the transaction system and continuously updates the fraudulent transaction pattern vault to maintain current and updated data, information, and patterns pertaining to potentially fraudulent transactions. As such, the output prediction may be stored in the fraudulent pattern vault in either of the memories 155 or 180, databases 159 or 184, or on the server 104. The fraudulent pattern vault may further employ one or more ML models to generate one or more fraudulent transaction patterns using one or more of the input parameters from block 1000 and the indication from an output prediction associated with the input parameters. The generated fraudulent transaction patterns may then be stored in the fraudulent pattern vault to be used in determining further fraudulent transactions.

Figure 3:
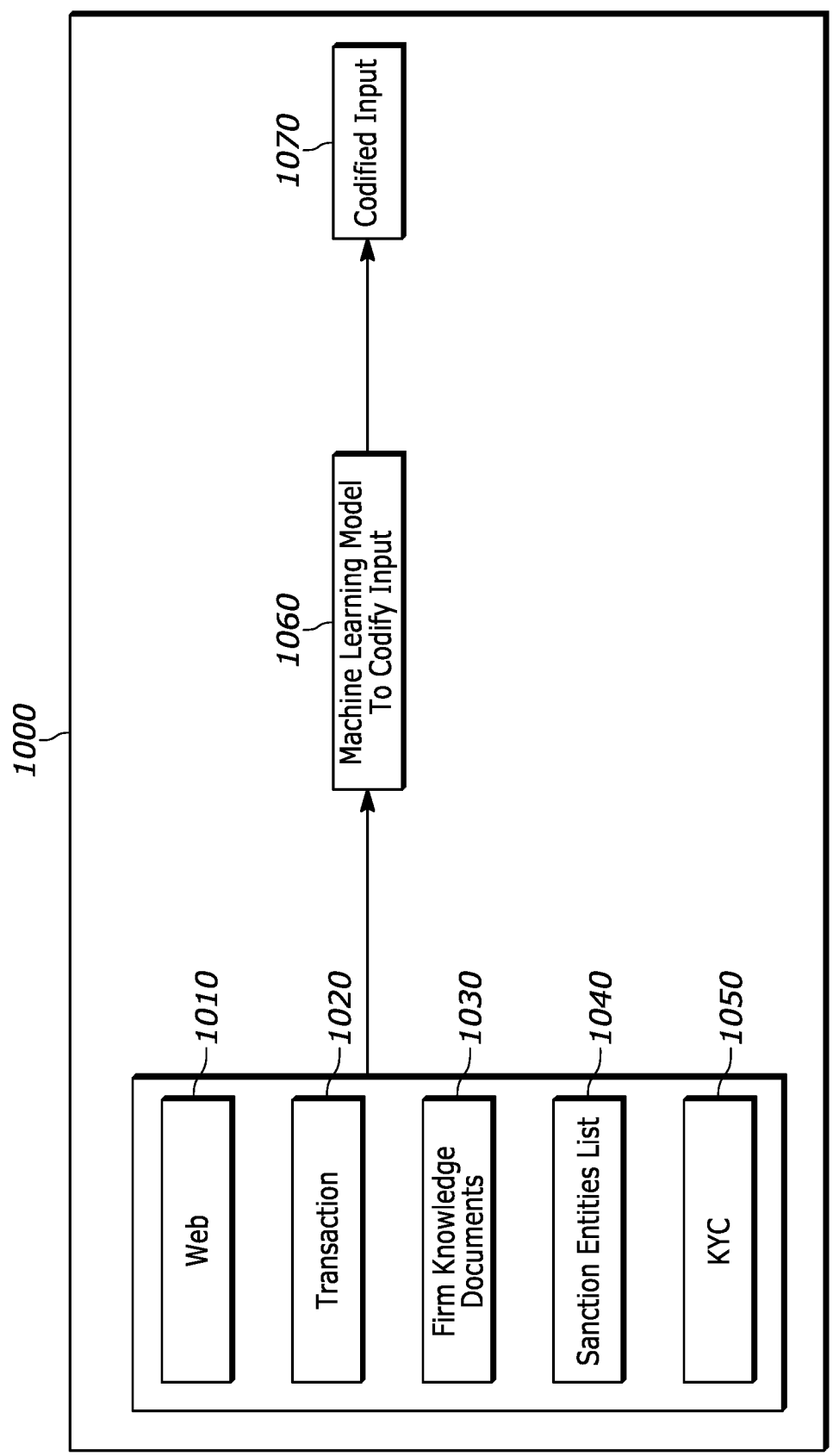
FIG. 3 depicts an exemplary block flow diagram depicting a detail of receiving input parameters with respect to FIG. 2.

FIG. 3 depicts an exemplary block flow diagram depicting a detail of receiving input parameters at block 1000 of FIG. 2. As shown in FIG. 3, the block 1000 may include receiving data and parameters from multiple inputs such as (i) data and information from the internet or the web (block 1010), transaction data (block 1020), (ii) information and data from a firm (e.g., consulting firm, financial firm, security firm, etc.), (iii) a sanctioned entities list or a parties of concern (PC) list (block 1040), and (iv) a know your customer (KYC) database pertaining to any entity or client associated with a transaction. The input parameters may include data generated by individuals, security documents, or other documents and data associated with a financial transaction. All of the input parameters then are passed through a ML learning model that codifies the input parameters (block 1060). The input parameters may be associated with different types of transactions, and different types of financial institutions, and at block 1060, the ML model characterizes according to the various types of potential input parameters and provides the codified input at block 1070. The processor 152 may use a classifier ML model, and/or a reinforced ML model to organize the input parameters and provide the codified input. Each of the codifying ML models applied at block 1060 may further be updated and retrained according to updated information, data, and patterns pertaining to fraudulent transactions.

Figure 4:
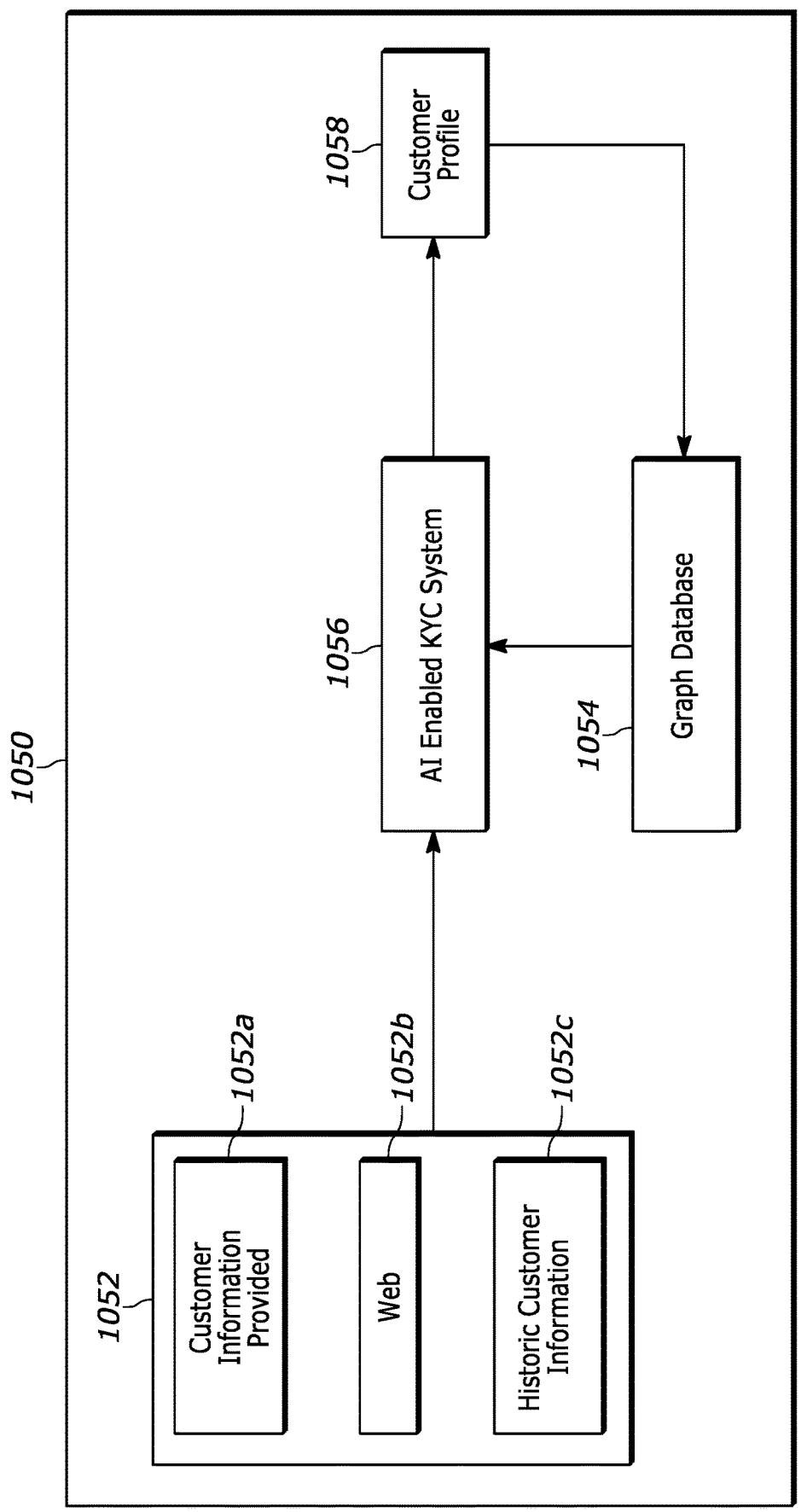
FIG. 4 depicts an exemplary block flow diagram depicting a detailed view of receiving know your customer (KYC) data with respect to FIG. 3, and the KYC data being passed through an intelligent system to generate a customer profile.

FIG. 4 depicts an exemplary block flow diagram depicting a detailed view of receiving KYC data at block 1050 of FIG. 3, and the KYC data being passed through an intelligent system to generate a customer profile. KYC information may be provided from various sources and means (block 1052). For example, a customer may provide information using a device such as the client device 102, or another device having an input such as a keyboard, mouse, touchscreen, etc. (block 1052*a*). KYC information may further be obtained from the web or the internet (block 1052*b*). For example, information pertaining to a client may be obtained from online news websites, social media sites, corporate websites, public records, blogs, etc. The KYC data may further be obtained from historic customer information such as transaction history patterns, past geographical locations of the client or of client transactions, open source/public data or internal data indicative of, or associated with, past fraudulent activity. The KYC data may include any information associated with or indicative of how a fraudulent transaction have occurred such as logging data regarding client day to day activities, transaction data on purchases or reservations, business related activities related to a specific process, etc.

A graph database is leveraged to provide information pertaining to how different clients or entities are related (block 1054). For example, the graph database may include a map showing a relationship between a historically fraudulent customer with a non-fraudulent customer. The map may be used to determine a distance (e.g., a distance in time, a distance between transactions or transaction types, a distance between clients across multiple client relationships, etc.) between clients to further determine if a non-fraudulent customer has a risk of becoming a fraudulent customer, or may be used to determine if the historically non-fraudulent customer has performed a fraudulent transaction.

All of the KYC information and data, and data from the graph database are provided as inputs to an artificial intelligence (AI) enabled KYC system (block 1056). The AI enabled KYC system creates a customer profile from the input KYC data and information and any customer and client relationships from the graph database (block 1058). The customer profile may include a graph data set or database, customer risk factor, customer personal elements or information, business information, and social elements or information.

The AI enabled KYC system may utilize the quantum computing processor to perform quantum computing algorithms to determine the customer profile, graph database, and customer risk rating. Due to the amount of information that may be collected pertaining to a single customer, traditional processing may take an extremely long time to determine a customer profile and risk factor, but utilizing the quantum computing processor allows for generating the customer profile and customer risk factor at runtime and/or in real-time during evaluation of a transaction, and further allows for the profile to be generated from larger volumes of sources and data. The use of the graphic database, large variety of input sources of the KYC data, and the quantum computing allows for the generation of a more full and robust "360 degree" customer profile that may allow for more accurate determination of fraudulent transactions.

FIG. 5 depicts an exemplary block flow diagram depicting a detail view of securing transaction data and information via quantum resistive cryptography at block 2000 of FIG. 2, and further to utilize ML algorithms to determine, and/or train, which of a plurality of algorithms should be used to encrypt the data and/or information associated with the transaction. The block 2000 includes leveraging multiple sets of quantum cryptography instructions (block 2010), including without limitation, (i) a Crystals-Kyber algorithm (block 2002), (ii) a Crystals-Dilithium algorithm (block 2004), a Falcon algorithm (block 2006), and a Sphincs algorithm (block 2008). While four sets of quantum encryption instructions are described, other instructions or algorithms may be used, and specifically, other quantum resistive cryptography instructions or algorithms may be beneficial to prevent decryption of data and information by quantum computers and quantum decryption methods.

The quantum cryptography algorithms at block 2010, and the codified input data at block 2020 and from block 1070 of FIG. 3, are passed to the ML model to collect information (block 2030). The ML model to collect all information collects the input data and the quantum cryptography models, and provides them to the ML model to extract and classify information and strategize for ML consumption. The ML model to collect all information collects, curates, and validates data, and further enhances the data with potentially new data, before it classifies and strategizes the feed in the following steps of the method. The methods described strategize the data and feed using ML models to identify a best next set of actions to continuously supply reliable data for use in a next fraud prediction model, and to generate future fraud prediction ML models.

At block 2040 the ML model extracts the data from the codified input data and creates a prediction model based on the input data determines which of the multiple quantum cryptography algorithms to use to encrypt the data. Each of the four algorithms at blocks 2002, 2004, 2006, and 2008 have different advantages and disadvantages that may be leveraged to best encrypt to ensure security of the data. The specific quantum cryptography model used may depend on the type of transaction, a type of data, and/or whether certain types of data are in transit, at rest, or in use during the execution of the MLD model.

Typical systems may only be able to use a single quantum cryptography algorithm on a set of data, which may not provide the best security and encryption for a given data and implementation. The described method allows for ML algorithms and the speed of quantum computing to allow for determination of a best and most secure quantum encryption method to be determined on a case by case basis at runtime and/or in real-time for a given transaction and associated transaction data and parameters.

At block 2040 the ML model to extract, classify information and strategize for ML consumption provides a determined quantum resistive cryptography algorithm to be used on the data (block 2060). The data is then encrypted using the determined quantum resistive cryptography instructions and the determined quantum resistive cryptography instructions are additionally provided as input data and real-time signals to block 2020, and is provided to the ML model for continuous learning (block 2050). The ML model for continuous learning may analyze real-time signals and the input data and determine quantum resistive cryptography instructions to determine patterns, data types, transaction types, etc. and associated trends that may further train the quantum resistive cryptography at block 2000 to further to better, or more efficiently, determine a best or most secure set of quantum resistive cryptography instructions for future transactions and associated sets of data.

Figure 6:
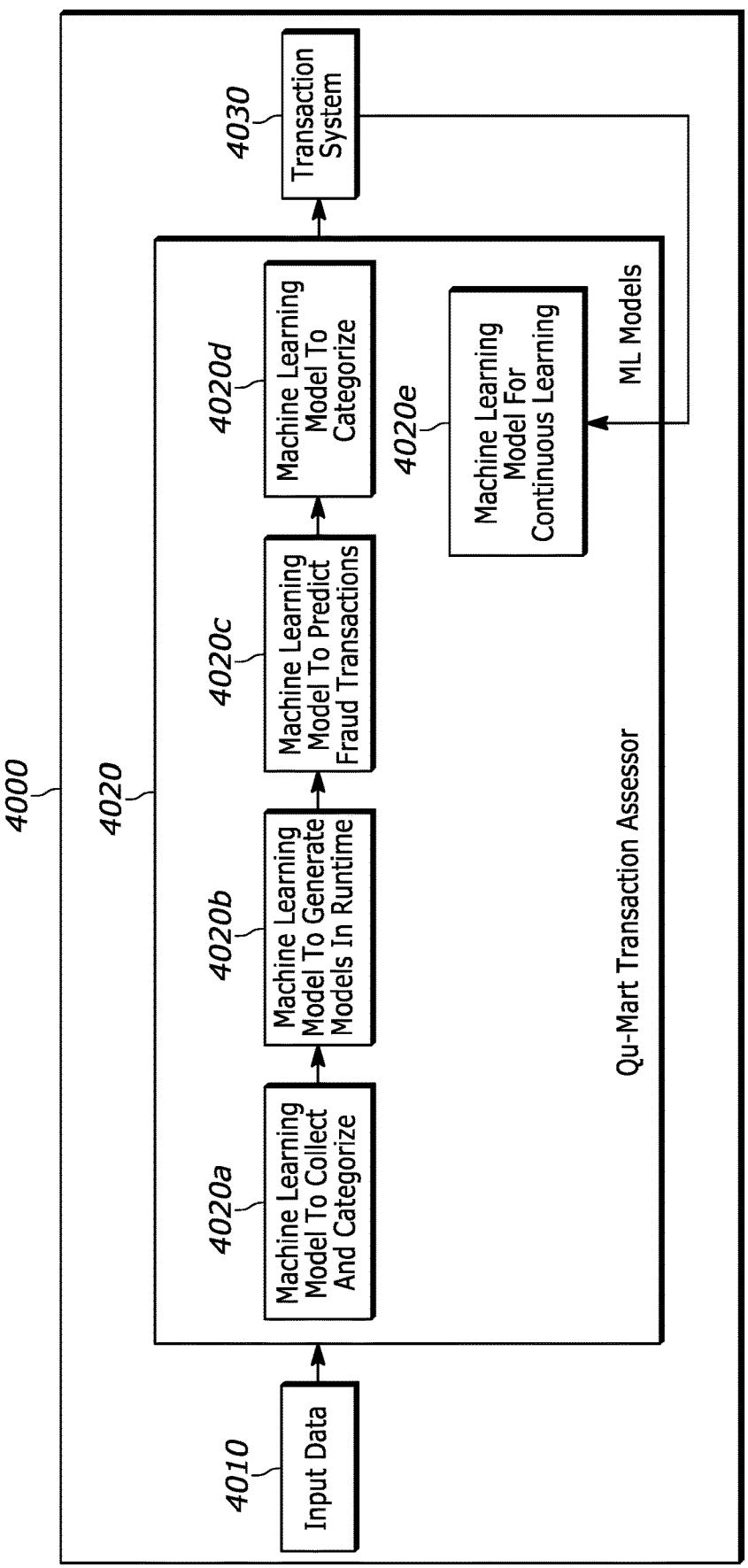
FIG. 6 depicts an exemplary block flow diagram depicting a detailed view of the Qu-mart transaction assessor (QTA)

FIG. 6 depicts an exemplary block flow diagram depicting a detailed view of the QTA at block 4000 of FIG. 2, to identify, train, or otherwise develop a ML model for flagging and/or verifying fraudulent transactions. Once the data is encrypted using the set of quantum resistive cryptography instructions, the encrypted data at block 4020 is provided to a series of Qu-Mart transaction assessor ML models (block 4020). A first ML model 4020*a* collects and categorizes the input data and real-time signals (block 4020*a*). A ML model to generate models in runtime then analyzes and may categorize the data to generate ML models for predicting, identifying, and/or verifying fraudulent transactions at runtime and/or in real-time (block 4020*b*). The ML models of the QTA ML models 4020 may each be performed by the quantum computer 175 to leverage the fast speeds of quantum processing to determine the ML prediction models at runtime, in real-time, or at near real time (e.g., in tens of milliseconds, on the scale of milliseconds, hundreds of microseconds, or less). Traditional ML training models and processes cannot provide real-time results using classical computing techniques, and therefore may not be able to determine and/or predict fraudulent transactions at runtime and/or in real-time.

At block 4020*b* the ML model generates a ML model to predict one or more fraudulent transactions based on the input data (block 4020*c*). The ML model to identify, verify, and/or predict fraudulent transactions, at block 4020*c*, then provides an indication of whether the transaction associated with the input data is fraudulent or not based on if the fraudulent transaction was identified, verified, or predicted as fraudulent. Based on a transaction type, financial organization type, customer profiling, customer location, risk rating, etc. a ML model to categorize categorizes the data and the determination of fraudulence. The ML model top categorize classifies and ranks various categories of transactions, and further determines and builds relevant patterns to be considered as future detectors or indicators of potential fraudulent activity and transactions. The ML model to categorize assists in re-organize data and patterns to continuously improve the predictions of the method.

The ML model to categorize then provides the determination of fraudulence and associated data to a financial transaction system 4030 for further processing of the information to reject a transaction, provide a warning of a transaction to a system or used, or otherwise process and/or use the determination of fraudulence and associated transaction data (block 4030). The transaction system provides the determination of fraudulence and associated transaction data to a ML model for continuous learning (block 4020*e*). The ML model for continuous learning may analyze the identification, verification, and/or prediction of fraudulence, or of non-fraudulence, to determine various data types, transaction types, financial institution types, user profiles, risk ratings, etc., and any patterns or trends of these various factors, to further train the QTA ML models to provide more accurate predictions and more efficient operation. As described, classical systems may not be able to determine ML identification, verification, and/or prediction models at runtime and/or in real-time, and further, classical processing systems are not able to continuously train, such as at block 4020*e*, in real-time to improve overall accuracy and efficiency of the ML models and determinations of fraudulence at runtime and/or in real-time due to the amount of information and various parameters required to provide accurate analysis of fraudulence and to train ML models.

While described as determining, flagging, and verifying fraudulent transactions in "real-time" and "near real time," the described methods and systems are described as being able to predict future types of fraudulent transactions based on trends of data types, transaction types, financial institution types, customer profiling, risk ratings, etc. Therefore, the described systems and methods may be able to predict a type of fraudulent activity, and/or associated data and trends, that may occur, and the described methods and systems may identify a fraudulent transaction according to the predicted parameters and characteristics without having any previous type of fraudulent transaction having been process in the method 200. As such, fraudulent trends of data and parameters may also be determined and used to further train various ML models of any of the processes of the method 200 to detect potential future trends of fraudulent transactions, and to perform pattern recognition of data and parameters associated with fraudulent transactions. In examples, the determined trends of fraudulent transactions may be useful in training a ML model capable of predicting when a fraudulent transaction may occur based on a type of transaction, customer type, risk profile etc.

FIG. 7 depicts an exemplary block flow diagram depicting a detail view of output system as the transaction system at block 5000 of FIG. 5 to clean transactions and document flagged fraudulent transactions and associated customers and other parameters and data associated with a fraudulent transaction. At output initiation (block 5002) the transaction system is provided the determination of fraudulence, or non-fraudulence, and any associated data from the Qu-mart transaction assessor of block 4000. The transaction system provides two paths: one for non-fraudulent or clean transactions, and a second path for fraudulent transactions. If at block 5002 the transaction system receives a non-fraudulent transaction and associated data and transaction parameters, the transaction system allows for the clean transaction to further be processed and may provide the clean transaction to be processed by another system or financial institution. As such, the transaction is effectively approved for further processing and fulfilling.

If at output initiation the transaction system received an indication of a determination of a fraudulent transaction along with associated data and parameters, the transaction system flags the fraudulent transaction (block 5006). The transaction system may then access documentation associated with one or more customers associated with a transaction (block 5008). To identify and access the customer documentation, the KYC input data and determined customer profile of blocks 1050 and 1058 of FIGS. 3 and 4 may be used to determine relevant documents and sources of information relevant to a specific customer. The customer documentation may include documentation and information of all parties associated with the fraudulent transaction include, without limitation, one or more originator, beneficiary, or intermediary individuals, agencies, or institutions.

A natural language processing system extracts the customer information for adjudication (block 5010). A ML model to collect information then collects the flagged transaction and associated data and parameters, and the NLP extracted information from the customer documentation (block 5012). Based on the data and information pertaining to the flagged fraudulent transaction, which may include a reason or specific data or trend to why the transaction was flagged as fraudulent is then extracted and used, along with the extracted and adjudicated customer information, a ML model to extract, classify information and adjudicate an alert further extracts and analysis the fraudulent transaction and associated data and the customer information and performs a verification of the fraudulence of the transaction (block 5014). In verifying the fraudulence of the transaction, the ML model to extract, classify information and adjudicate verifies if the flagged fraudulent transaction is genuinely a fraudulent transaction (i.e., a true positive determination), or if the flagged fraudulent transaction is actually a non-fraudulent transaction (i.e., a false positive determination) from the flagged transaction, associated data, and customer information.

The ML model to extract, classify information and adjudicate alert then provides the adjudication outcome (block 5018). The adjudication outcome may be provided to a system, financial institution, or a user, for example via the network 110, client device 102, or may be provided to a third party system.

Further, the adjudication outcome is further provided to a ML model for continuous learning (block 5016). The ML model for continuous learning may analyze the adjudication outcome, documentations of customers, and flagged transactions and associated data and parameters to train and improve the performance (e.g., efficiency, accuracy, etc.) of the ML model to extract, classify information, and adjudicate alert.

Additional Considerations

With the foregoing, users whose data is being collected and/or utilized may first opt-in. After a user provides affirmative consent, data may be collected from the user's device (e.g., a mobile computing device). In other embodiments, deployment and use of neural network models at a client or user device may have the benefit of removing any concerns of privacy or anonymity, by removing the need to send any personal or private data to a remote server.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment", "in one aspect" or the like in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for the method and systems described herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed:

1. A computer-implemented method for secure transaction processing using machine learning and quantum computing, the method comprising:
   receiving, via one or more classical processors, input parameters corresponding to a transaction;
   processing, via one or more quantum computing processors, the input parameters using a set of executable quantum resistive cryptography instructions to generate encrypted transaction data from the input parameters;
   generating, by the one or more quantum computing processors using one or more trained machine learning models, an indication of whether a transaction is fraudulent based at least upon the encrypted transaction data;
   transmitting the indication via an electronic network;
   storing, via the one or more classical processors, the indication in a memory;
   training, via the one or more quantum computing processors, a pattern machine learning model using continuous learning to generate one or more fraudulent transaction patterns using at least (i) the input parameters, and (ii) the indication; and
   storing, via the one or more classical processors, the one or more fraudulent transaction patterns in a memory.

2. The computer-implemented method of claim 1, wherein the input parameters include one or more of (i) information from the Internet, (ii) transactions, (iii) firm knowledge documents, (iv) data generated by individuals, (v) security documents, (vi) a sanction entities list, (vii) a PC entity list, or (viii) know your customer data corresponding to one or more of customer-provided information, information corresponding to a customer from the Internet, and historical customer information.

3. The computer-implemented method of claim 1, further comprising:
   processing know your customer data to generate a graph database that includes a customer profile including a customer risk rating.

4. The computer-implemented method of claim 1, further comprising, processing, via the one or more classical processors, the input parameters using at least one of a (i) classifier machine learning model, and (ii) a reinforced machine learning model to codify the input parameters into codified input parameters.

5. The computer-implemented method of claim 1, wherein the set of executable quantum resistive cryptography instructions includes at least one of CRYSTALS—Kyber instructions, CRYSTALS, Dilithium instructions, a Falcon instructions, or a Sphincs instructions.

6. The computer-implemented method of claim 1, further comprising selecting, via the quantum computing processors, the set of executable quantum resistive cryptography instructions at runtime and/or in near-real time based upon processing the input parameters using one or more trained machine learning models.

7. The computer-implemented method of claim 1, wherein at least one of the machine learning models is trained at runtime and/or in near real-time using the quantum computing processors.

8. A computing system for secure transaction processing using machine learning and quantum computing, comprising:
   one or more classical processors;
   one or more quantum computing processors; and
   a memory having stored thereon instructions that, when executed, cause the computing system to:
   receive, via the one or more processors, input parameters corresponding to a transaction;
   process, via the one or more quantum computing processors, the input parameters using a set of quantum resistive cryptography instructions to generate encrypted transaction data from the input parameters;
   generate, by the one or more quantum computing processors using one or more trained machine learning models, an indication of whether a transaction is fraudulent based at least upon the encrypted transaction data;
   transmit the indication via an electronic network;
   store, via the one or more classical processors, the indication in the memory;
   train, via the one or more quantum computing processors, a machine learning model to generate one or more fraudulent transaction patterns using at least (i) the input parameters, and (ii) the indication; and
   store, via the one or more classical processors, the one or more fraudulent transaction patterns in a memory.

9. The computing system of claim 8, wherein the input parameters include one or more of (i) information from the Internet, (ii) transactions, (iii) firm knowledge documents, (iv) data generated by individuals, (v) security documents, (vi) a sanction entities list, (vii) a PC entity list, or (viii) know your customer data corresponding to one or more of customer-provided information, information corresponding to a customer from the Internet, and historical customer information.

10. The computing system of claim 8, the memory having stored thereon further instructions that, when executed, cause the computing system to:
   process know your customer data to generate a graph database that includes a customer profile including a customer risk rating.

11. The computing system of claim 8, the memory having stored thereon further instructions that, when executed, cause the computing system to select, via the one or more quantum computing processors, the set of executable quantum resistive cryptography instructions at runtime and/or in near-real time based upon processing the input data using one or more trained machine learning models.

12. The computing system of claim 8, wherein at least one of the machine learning models is trained at runtime and/or in near real-time via the one or more quantum computing processors.

13. A computing system, comprising:
   a first non-transitory computer-readable storage medium having stored thereon executable instructions that, when executed by one or more quantum computing processors, cause the one or more quantum computing processors to perform operations of:
   process, input parameters corresponding to a transaction using a set of quantum resistive cryptography instructions to generate encrypted transaction data from the input parameters;
   generate, using one or more trained machine learning models, an indication of whether a transaction is fraudulent based at least upon the encrypted transaction data;
   transmit the indication via an electronic network;
   train, a pattern machine learning model to generate one or more fraudulent transaction patterns using at least (i) the input parameters, and (ii) the indication; and
   a second non-transitory computer-readable storage medium having stored thereon executable instructions that, when executed by one or more classical processors, cause the one or more classical processors to perform operations of:
   receive, input parameters corresponding to a transaction;
   store, the indication in a memory; and
   store, the one or more fraudulent transaction patterns in a memory.

14. The first non-transitory computer-readable storage medium of claim 13, wherein the input parameters include one or more of (i) information from the Internet, (ii) transactions, (iii) firm knowledge documents, (iv) data generated by individuals, (v) security documents, (vi) a sanction entities list, (vii) a PP entity list, or (viii) know your customer data.

15. The first non-transitory computer-readable storage medium of claim 13, storing further executable instructions that, when executed, cause the one or more quantum computing processors to perform operations of:
   process know your customer data to generate a graph database that includes a customer profile including a customer risk rating.

16. The first non-transitory computer-readable storage medium of claim 13, storing having stored thereon further executable instructions that, when executed, cause the one or more quantum computing processors to perform operations of:
   select, via the one or more quantum computing processors, the set of executable quantum resistive cryptography instructions at runtime and/or in near-real time based upon processing the input data using one or more trained machine learning models.

17. The first non-transitory computer-readable storage medium of claim 15, wherein at least one of the machine learning models is trained at runtime and/or in near real-time via the one or more quantum computing processors.

\* \* \* \* \*